United States Patent
Cornu et al.

(10) Patent No.: US 12,188,101 B2
(45) Date of Patent: Jan. 7, 2025

(54) METHOD AND APPARATUS FOR MANUFACTURING A PART USING SUCCESSIVE DEPOSITION OF LAYERS

(71) Applicant: SAFRAN, Paris (FR)

(72) Inventors: Daniel Cornu, Moissy-Cramayel (FR); Jawad Badreddine, Moissy-Cramayel (FR); Vincent Dessoly, Moissy-Cramayel (FR)

(73) Assignee: SAFRAN, Paris (FR)

( * ) Notice: Subject to any disclaimer, the term of this patent is extended or adjusted under 35 U.S.C. 154(b) by 963 days.

(21) Appl. No.: 15/999,523

(22) PCT Filed: Feb. 17, 2017

(86) PCT No.: PCT/FR2017/050363
§ 371 (c)(1),
(2) Date: Aug. 17, 2018

(87) PCT Pub. No.: WO2017/140994
PCT Pub. Date: Aug. 24, 2017

(65) Prior Publication Data
US 2021/0178485 A1 Jun. 17, 2021

(30) Foreign Application Priority Data
Feb. 19, 2016 (FR) ...................................... 1651359

(51) Int. Cl.
*B22F 10/66* (2021.01)
*B22F 10/28* (2021.01)
(Continued)

(52) U.S. Cl.
CPC .............. *C21D 7/06* (2013.01); *B22F 10/28* (2021.01); *B22F 10/62* (2021.01); *B22F 10/66* (2021.01);
(Continued)

(58) Field of Classification Search
CPC ....... B33Y 10/00; B23K 26/342; B22F 10/66; B22F 10/62; B22F 12/70; C21D 7/06
See application file for complete search history.

(56) References Cited

U.S. PATENT DOCUMENTS 5,619,877 A * 4/1997 Graf ...................... B24B 39/026
451/465
5,778,713 A * 7/1998 Butler ...................... B24C 9/00
451/39
(Continued)

FOREIGN PATENT DOCUMENTS

CA 2864297 A1 * 8/2013 .............. B22F 3/003
EP 0529816 A1 * 7/1992 ........... G05B 19/405
(Continued)

OTHER PUBLICATIONS

Machine translation of JP 4099642 B2 performed on Feb. 29, 2024, Ishikawa et al. (Year: 2008).*
(Continued)

*Primary Examiner* — Dana Ross
*Assistant Examiner* — Kevin Guanhua Wen
(74) *Attorney, Agent, or Firm* — Christensen O'Connor Johnson Kindness PLLC

(57) ABSTRACT

A method for manufacturing at least one portion of a part using successive deposition of layers, involving the steps of: a) depositing a first layer of a molten metal on a substrate such that a first metal strip is formed on the substrate; b) depositing a second layer of a molten metal on the first strip such that a second metal strip is formed on the first strip; and c) repeating steps a) and then b) for each new metal layer to be deposited on a preceding strip until the at least one portion of the part has been formed. The method may further include step d) compressing the formed bead after performing n instances of step c), n being greater than or equal to 1.

(Continued)

The step of compressing the formed bead may be performed before the complete cooling of said bead.

7 Claims, 2 Drawing Sheets

(51) Int. Cl.
| | | |
|---|---|---|
| *B22F 10/62* | (2021.01) | |
| *B22F 12/41* | (2021.01) | |
| *B22F 12/53* | (2021.01) | |
| *B22F 12/70* | (2021.01) | |
| *B23K 26/14* | (2014.01) | |
| *B23K 26/342* | (2014.01) | |
| *B33Y 10/00* | (2015.01) | |
| *B33Y 30/00* | (2015.01) | |
| *B33Y 40/00* | (2020.01) | |
| *C21D 7/06* | (2006.01) | |
| *B22F 10/25* | (2021.01) | |

(52) U.S. Cl.
CPC .............. *B22F 12/41* (2021.01); *B22F 12/53* (2021.01); *B22F 12/70* (2021.01); *B23K 26/1464* (2013.01); *B23K 26/342* (2015.10); *B33Y 10/00* (2014.12); *B33Y 30/00* (2014.12); *B33Y 40/00* (2014.12); *B22F 10/25* (2021.01)

(56) References Cited

U.S. PATENT DOCUMENTS

| | | | |
|---|---|---|---|
| 2004/0099983 A1 | 5/2004 | Dirscherl | |
| 2010/0330385 A1* | 12/2010 | Sawaguchi et al. | ..... C21D 7/06 428/544 |
| 2014/0000330 A1* | 1/2014 | Hatou | ................... B24C 7/0007 72/53 |
| 2017/0087670 A1* | 3/2017 | Kalentics | ............... B33Y 30/00 |
| 2017/0120332 A1* | 5/2017 | DeMuth | ................. B22F 10/30 |

FOREIGN PATENT DOCUMENTS

| | | | | |
|---|---|---|---|---|
| EP | 2 135 698 A1 | | 12/2009 | |
| EP | 2463392 A1 | * | 6/2012 | ............... C21D 7/06 |
| GB | 2508335 A1 | * | 4/2014 | ............. B23K 26/34 |
| GB | 2508335 A | * | 6/2014 | ......... B23K 26/0622 |
| JP | 2002346847 A | * | 12/2002 | ......... B23K 26/0069 |
| JP | 4099642 B2 | * | 6/2008 | ............. B23K 26/00 |

OTHER PUBLICATIONS

International Search Report mailed Jul. 11, 2017, issued in corresponding International Application No. PCT/FR2017/050363, filed Feb. 17, 2017, 6 pages.

Schilling-Praetzel, M., et al., "Influence of Temperature of Shot Peening on Fatigue Life," in D. Kirk (ed.), Proceedings in the Fifth International Conference on Shot Peening (ICSP5), Oxford University, U.K., Sep. 13-17, 1993, vol. 5, pp. 227-238.

\* cited by examiner

METHOD AND APPARATUS FOR MANUFACTURING A PART USING SUCCESSIVE DEPOSITION OF LAYERS

TECHNICAL FIELD

The invention relates to an additive manufacturing method and device for manufacturing a part using successive depositions of layers.

PRIOR ART

The prior art comprises, in particular, documents FR-A1-2 816 836, EP-A1-0 529 816, US-A1-2004/099983, EP-A1-2 135 698, GB-A-2 508 335 and FR-A1-2 998 496.

There are at least two types of additive manufacturing methods used to obtain a part: the part is either manufactured by successive depositions of molten matter (FIG. 1), or the part is manufactured by successive powder bed fusion operations.

The device shown in FIG. 1 is used to manufacture a part by successive depositions of layers or of molten matter. The part is produced by the superimposition of layers 10 on a substrate 80. The device comprises a laser head 20 emitting a beam 22 that melts the matter, such as a metal alloy.

This additive manufacturing technique is known by several names, most of which are the commercial brands of various device manufacturers or research establishments: deposition by laser [Laser Metal Deposition (LMD)], direct metal deposition [Direct Metal Deposition (DMD)], direct laser deposition [Direct Laser Deposition (DLD)], laser engineered [Laser Engineered Net Shaping (LENS)], laser cladding [laser cladding], laser deposition welding and laser powder fusion welding.

The laser beam 22 forms a molten pool on the substrate 80, on which a powder 24 is deposited, using for example the laser head 20, as shown in the drawing. The powder melts, forming a layer 10 or bead that adheres to the substrate by fusion. Then a plurality of layers or beads are superimposed on top of the first bead to create the part. The laser head 20 is generally controlled by a robot.

A wide range of alloys of titanium, nickel, cobalt, WC (tungsten carbide) and steel can be used, including Ti-A16-4V, Inconel-718, Rene-142 and Stellite-6.

The standard laser sources are CO2, Yb fibres and the Nd-YAG disc.

This technique is used in aeronautics for example, to manufacture certain parts of an aircraft turbojet engine.

When using the abovementioned technique for the additive manufacturing of a part, a deformation of the solid areas can occur, due to the increase of residual stress. This bead-by-bead or layer-by-layer rapid solidification has several drawbacks: oxidation risk between layers reducing the metallurgical health of the part (poor mechanical characteristics and poor cohesion between layers), bead deformation if the stress is significant, causing the offset of the upper layers, etc. Furthermore, the directional thermal transfer to the manufacturing substrate induces a columnar growth of the grains, the final material being anisotropic. It is indeed important to achieve the best possible control over the generation of residual stress and the anisotropy of the microstructure to be able to produce sound parts.

This invention provides a simple, efficacious and cost-efficient solution to these problems.

PRESENTATION OF THE INVENTION

The invention therefore provides a method to manufacture at least a portion of a part by successive depositions of layers, comprising the following steps:

a) depositing a first layer of molten metal on a substrate, so as to form a first metallic bead on the substrate,
b) depositing a second layer of molten metal on said first bead, so as to form a second metallic bead on said first bead, and
c) repeating steps a) and b) for each new metallic layer to be deposited on top of the previous bead, until the formation of said at least one portion of the part,
characterised in that it comprises, after n step(s) of deposition, n being greater than or equal to 1, a step whereby the formed bead is compressed, and in that the compression step is performed hot, i.e. before the complete cooling of said bead.

The invention therefore seeks to improve the properties of the beads by treating them immediately after their deposition, before being covered by the subsequent bead. The bead-by-bead or layer-by-layer compression treatment enables the modification/removal of the stress applied to the beads, the hardening of the material of the beads and even the pickling of oxides, thereby making it possible to treat deformation aspects, the anisotropy of the structure and bonding flaws. By hardening the surface, the structure is regenerated to prevent epitaxial growth. Shot peening can also be used to remove the oxide layer before the deposition of the subsequent layer, to improve adherence or to change the microstructure of the shot-peened layer.

For this purpose, the invention combines two very different methods, i.e. the additive manufacturing by successive depositions of layers and the compression thereof, for instance by shot peening. These two processes can use materials in the form of a powder or as particles, which can be identical so as not to pollute the part being manufactured.

The method according to the invention can comprise one or more of the following features, taken individually or in combination:

the compression step is performed when the material of said bead is at a temperature of more than 30° C., preferably more than 100° C., more preferably more than 200°, and for example approximately 300° C.,
the compression step is performed by projecting a flow of gas, for example compressed air or nitrogen, onto said bead,
the compression step is performed by shot peening said bead,
shot peening is performed with particles of a material that is identical to the material of a powder used for the manufacturing of the beads, the size of said particles being preferably different from the size of the particles of said powder. This simplifies powder reprocessing and management, or prevents contamination by other alloys,
shot peening is performed with particles of a material that is different from the material used to manufacture the beads. This allows for greater flexibility on the generated residual stress (depth and levels reached), by acting on the relative hardness of the selected media and the material used for additive manufacturing,
the compression step is configured so as to allow:
  i. introduction of residual compression stress to counter the residual fusion-generated tensile stress, in order to minimise deformation, and/or
  ii. pickling of any oxide layer that has developed on the surface of the bead, and/or
  iii. modification of the initial bead microstructure (anisotropic or columnar) by shot peening to achieve a homogeneous microstructure (multidirectional or grain size reduction), and/or iv. densification of the deposited matter to reduce the porosity induced by the additive manufacturing process.

This succession of steps improves the final mechanical properties of the part, thereby preventing cracking phenomena (step i), and can also be used to control the development of one or more microstructures within the part. These microstructures can be homogeneous at the scale of the completed part or localised, depending on the intended industrial applications (step iii).

The invention also relates to a device to implement the method described above, characterised in that it comprises:
  a laser head configured to melt the filler metal for the purpose of creating a bead, and
  a nozzle for the compression of said bead.
Advantageously, the laser head and the nozzle are supported by a shared robotic arm.

BRIEF DESCRIPTION OF THE FIGURES

The invention will be better understood, and other details, features and advantages of this invention will become clearer upon reading the following description, provided as an example and not limited thereto, and with reference to the appended drawings, in which.

DETAILED DESCRIPTION

Additive manufacturing has many advantages, including reduced manufacturing time, reduced costs and reduced overheads compared with moulded parts, injected parts or parts machined from a billet.

However, parts created by additive manufacturing feature some drawbacks: during solidification, residual tensile stress develops with each new layer, and can cause cracking.

Figure 2:
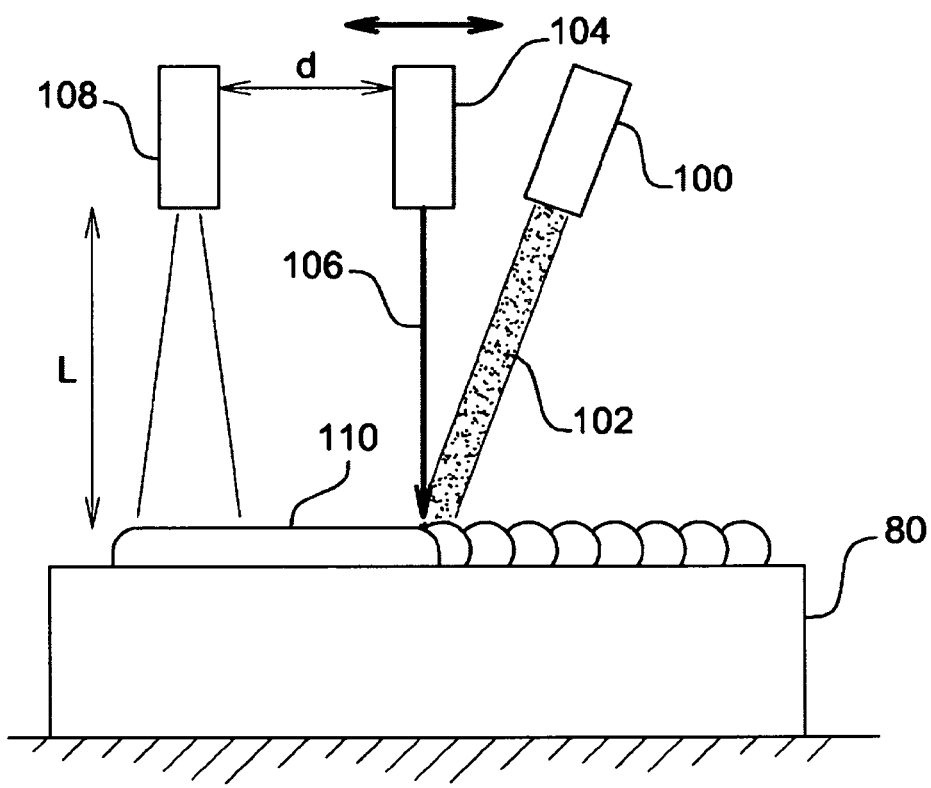
FIG. 2 is a highly schematic view of the general principle of the invention.

The invention seeks to remedy these disadvantages with a manufacturing device as shown in FIG. 2, which comprises:
  a first nozzle 100 for the deposition of powder 102 on the substrate 80,
  a head 104 emitting a laser beam 106, and
  a second nozzle 108 for the compression of the bead 110 after it has been created and before it is covered by the subsequent bead.

Figure 1:
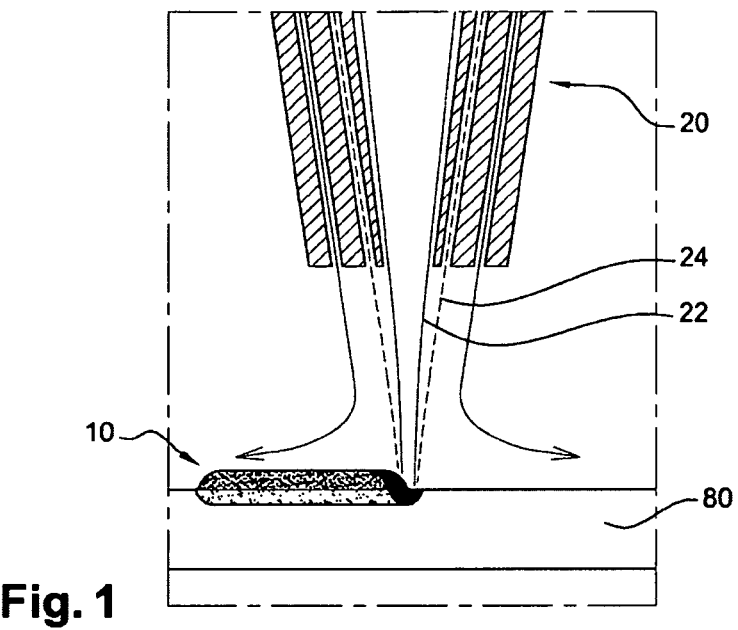
FIG. 1 is a schematic and perspective view of a device to manufacture a part using additive manufacturing according to the prior art.

As shown in FIG. 1, the function of the nozzle 100 could be integrated in the laser head 104. In this case, the device would feature a laser head 104 configured to deposit powder 102 on the substrate 80, as well as the nozzle 108.

The method according to the invention comprises, after each step whereby a layer or a bead is created, a step whereby the bead 110 is compressed.

Preferably, the compression of the bead 110 is achieved by shot peening or by gas-cooling of the bead, after the passage of the beam 106 on the layer to provide a layer-by-layer or a bead-by-bead treatment, and to apply compression stresses, or to achieve a required microstructure. Shot peening or cooling have different effects depending on the temperature of the substrate, the positioning of the head 104 that emits the beam 106, etc. For example, this temperature can be managed by identifying the surface isotherms of each bead 110.

In the specific case of the bead being compressed when the bead is at ambient temperature, the working distance L between the layer and the head 104 can be of approximately 150 mm. This head 104 can have a diameter of 6 mm and the shot peening can be performed by depositing particles with a diameter of approximately 100 μm at a pressure of 0.2-0.8 MPa.

In the specific case of compression being performed when the bead is at high temperature (for example of around 300° C.), shot peening can be conducted at a pressure of 0.6 MPa with shots of 1.0 mm. These shot peening operations can be followed by a treatment of the microshot peening type, which is performed at a pressure of 0.6 MPa with shots of 0.1 mm.

The application of the invention on a steel bead featuring high hardness (600-1000 HV) achieves a surface stress of approximately −350 to −500 MPa, a maximum compression stress of around −400 to −2000 MPa, a maximum stress depth of around 5 to 20 μm, and a compression depth ranging from 50 to 100 μm.

For shot peening operations, a guided microshot peening nozzle can be used, using a fine powder with a particle size of 10 to 100 μm. The impact surface can be of a few square millimetres and the affected depth can range between 50 to 150 μm.

This is compatible with direct laser deposition methods. With the direct laser deposition method, fused layers have a thickness of around 200 to 500 μm. The fused powders have the same grain size; it is possible to consider using the same powders to avoid contaminating the parts. Shot peening works on the same scale as the abovementioned additive manufacturing method.

For stress-related aspects, depth stress modifications can be modulated. It is also possible to use the cooling effect of the carrier gas to change stress values and limit oxidation.

As mentioned above, compression can also be introduced by means of a carrier gas, without using a medium such as microshot peening, in order to temper the bead of matter and introduce residual stresses therein. The expelled gas can be a neutral gas or a reagent gas. Preferably, the flow is sufficient to accelerate the cooling of the bead faster than by conduction through the support.

The microshot peening or gas flow emitting nozzle 108 must follow the head 104 to impact the hardened bead with a slight delay that is determined, for instance, based on the distance d between the nozzle and the head, d being a factor of the cooling temperature of the bead and the temperature that is suitable for the compression of the bead. In fact, the guiding of the orientation of the shot peening nozzle is preferably differentiated from the guiding of the projection nozzle.

The emitting head 104 and the second nozzle 108, and even the first nozzle 100, are preferably supported by a shared robotic arm.

Figure 3:
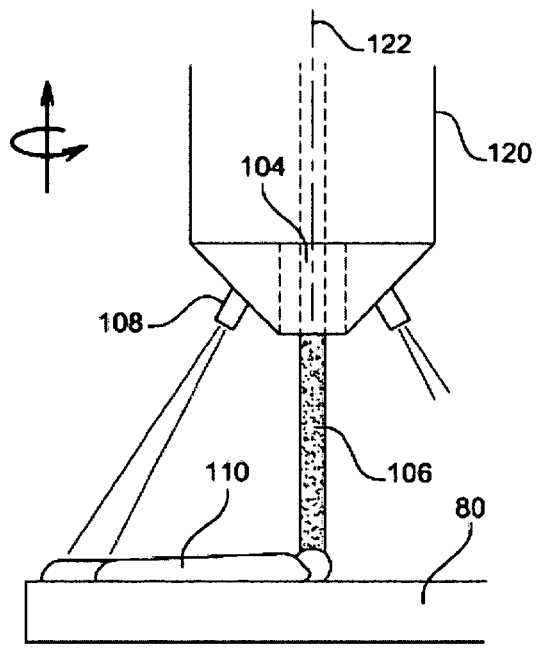
FIG. 3 is a highly schematic view of an embodiment of the device according to the invention.
Figure 4:
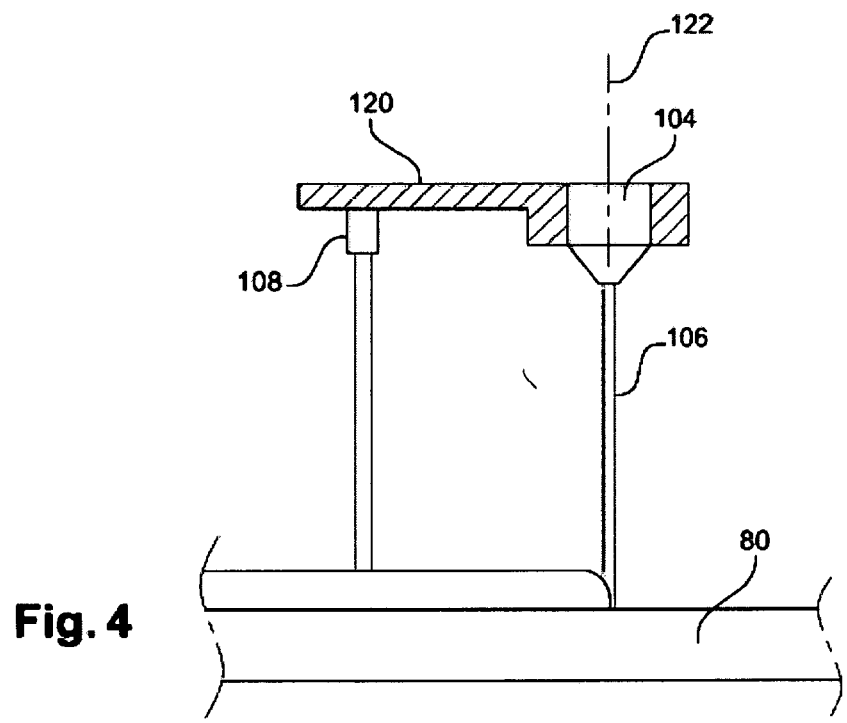
FIG. 4 is a highly schematic view of another embodiment version of the device according to the invention.

FIGS. 3 to 4 each represent two embodiments of the device according to the invention. In FIG. 3, the arm 120 is rotationally mobile about an axis 122, for example a vertical axis. The head 104 is centred on the axis 122 and the outputs of the microshot peening nozzle are located on a circumference centred on the axis 122. The arm is moved along a plane that comprises the axis 122, such as the plane of the drawing, and the nozzle 108 located downstream from the beam 106, with respect to the travelling direction of the arm, is used to compress the beam.

As shown in FIG. 4, the arm 120 supports the shot peening nozzle 108 and the beam-emitting head 104, the distance between them being changeable by moving the nozzle in translation with respect to the arm. The arm is longitudinally and rotationally movable both in translation and in rotation about the axis 122 of the head 104.

If the shot peening particles are of the same nature as the powder particles, there is a risk of a greater loss of powder. One solution resides in the use of a powder with a coarser particle size, so that the particles can be retrieved by sieving, or using a powder of a different material, such as ceramic, that can be retrieved by magnetic separation.

The invention claimed is:

1. A method for manufacturing at least a portion of a part by successive depositions of layers, comprising the following steps:
   a) depositing a first layer of molten metal on a substrate, so as to form a first metallic bead on the substrate,
   b) depositing a second layer of molten metal on said first bead, so as to form a second metallic bead on said first bead, steps a) and b) being performed using a laser head configured to melt a filler metal to form the molten metal, and
   c) repeating steps a) and then b) for each new metallic layer to be deposited on top of the previous bead, until the formation of said at least one portion of the part,
   d) compressing, after performing n instances of step c), n being greater than or equal to 1, the formed bead to relieve stress in the formed bead,
   wherein the step of compressing the formed bead is performed by shot peening, the shot peening being performed using a shot peening nozzle configured for the compression of said bead to relieve stress in the bead, the shot peening nozzle being configured to follow the laser head to impact the bead with a delay that is determined based on a distance between the shot peening nozzle and the laser head, the distance being determined on the basis of the cooling temperature of the bead and the temperature for the compression of the bead so that the step of compressing the formed bead is performed before the complete cooling of said bead and when the material of said bead is at a temperature of more than 100° C.,
   wherein shot peening is performed with particles of powder material having a size of 10 μm to 100 μm,
   wherein the bead is affected along a depth of between 50 μm and 150 μm.

2. The method of claim 1, wherein shot peening is performed with particles of powder material used for the manufacturing of the beads, the size of said particles for shot peening being different from the size of particles of said powder.

3. The method of claim 1, wherein shot peening is performed with particles of material different from material used to manufacture the beads.

4. The method of claim 1, wherein the step of compressing the formed bead is configured to enable one or more of the following:
   i) introduction of residual compression stress to counter the residual fusion-generated tensile stress to minimize deformation;
   ii) pickling of any oxide layer that has developed on the surface of the bead;
   iii) modification of the initial bead microstructure by shot peening to achieve a homogeneous microstructure; and
   iv) densification of the deposited matter to reduce the porosity induced by the additive manufacturing process.

5. The method of claim 1, wherein the step of compressing the formed bead is performed when the material of said bead is at a temperature of more than 200° C.

6. The method of claim 1, wherein the step of compressing the formed bead is performed when the material of said bead is at a temperature of about 300° C.

7. The method of claim 1, where the shot peening step is followed by a micro shot peening step at pressure of 0.6 MPa with particles of powder material having a size of 0.1 mm.

* * * * *